United States Patent Office 3,830,899
Patented Aug. 20, 1974

3,830,899
PROCESS FOR THE MANUFACTURE OF ARTI-
FACTS COMPRISING A SUPPORTING STRUC-
TURE OF REINFORCED THERMOSETTING
PLASTICS
Dino Piccioli, and Christian Schmid, Milan, Italy, as-
signors to Ginsa General Inventors Sociedad Anonima,
Panama
Filed Nov. 30, 1971, Ser. No. 203,255
Claims priority, application Italy, Dec. 5, 1970,
32,703/70; Sept. 13, 1971, 28,542/71
Int. Cl. B29d 27/00
U.S. Cl. 264—47
19 Claims

ABSTRACT OF THE DISCLOSURE

A process for the manufacture of load bearing plastics material structures is disclosed. The process allows small products to be made by mass production methods or large articles to be made *in situ*, by using, in both cases, the essential steps of the invention. A layer of plastics material is formed to the shape of the article to be manufactured and onto it is formed an intermediate layer having spaces which are subsequently filled with a material which will bond to the plastics material layer to form interconnecting strengthening ribs. The intermediate layer may be formed by a plurality of suitably spaced blocks or strips, or by a helically wound strip in the manufacture of a tubular article, or by forming a continuous layer and subsequently cutting out the spaces required for the strengthening ribs. After the material forming the strengthening ribs has been put into the spaces provided therefor a further plastics material layer is formed over the intermediate layers and the structure is bonded by polymerising the two said plastics material layers to the strengthening ribs. In an alternative described in the specification the intermediate layer may be formed first, provided with strengthening ribs, then the two plastics material layers formed on the inner and outer faces of the intermediate layer, and finally the whole structure is bonded by polymerisation of at least the two plastics material layers, and possibly of the strengthening ribs if these are formed of a thermosetting plastics material.

BACKGROUND OF THE INVENTION

The present invention relates to processes for the manufacture of articles having a load bearing structure of thermosetting plastics material and the products obtained by such processes.

The products which may be formed by the process of this invention may be any type of flat or curved structural elements such as, for example, covers, beams, tubes, reservoirs, boats, towers or any other similar articles.

In particular, products made by the process of this invention may comprise a thermo-setting plastics structure which is reinforced in part or completely with a reinforcement material such as, for example, suitable tissues, felts, matting, threads or granules.

It is known that plastics materials in general, and certain reinforced organic resins in particular are becoming more and more important in the manufacturing field due to a number of advantages inherent in the materials themselves. The use of these materials has nevertheless not been adequately developed up to now, either in the field of structural engineering, or for the manufacture of large products such as those mentioned above. This situation has been pointed out for example by E. N. Doyle in his book "The Development and Use of Polyester Products," McGraw-Hill, 1969 edition, where it is stated that there is a real need for manufactured products, and civil works in general, such as large reservoirs, large tubes, girders and the like, made in reinforced polyester, but that no satisfactory process for the manufacture of such products had yet been found.

Known manufacturing techniques for making articles of the type mentioned above, include processes which consist of the manufacture of bodies having an alveolar structure, which may be formed, for example by extrusion, and which are then used as construction elements in processes which are known from the use of other materials such as wood and metal.

The cavities in the alveolar structures are sometimes filled with a reinforcement material which is generally injected into the cavities after the structure has been formed.

One known constructional process of this type has been used for the manufacture of a tube of plastics material having a double wall with a plurality of transverse internal elements connecting the walls and forming cavities parallel to the axis of the tube, the cavities then being filled with a setting material which provides further structural support.

Another known process, which is used particularly for the manufacture of tubular bodies, includes the procedure of forming a tube by helically winding a double walled strip, the strip having an internal cellular structure and being produced in advance by extrusion.

Also, for the manufacture of cylindrical articles, it is known to wind one or more layers of filiform reinforcement material impregnated with resin onto a hollow core which then forms the internal wall of the finished cylindrical body. Such a process, however, does not provide an alveolar structure of sufficient strength to be used as a load bearing member.

Similarly, the known processes for the manufacture of flat or variously moulded articles made of reinforced plastics material generally comprise the step of forming panels with a composite or sandwich structure which are made in advance and subsequently used as construction elements to be fixed together by means of fixing devices or by adhesives. One such known process is used for the manufacture of hulls for ships by the erection of moulded panels.

All the processes discussed above evidently cannot be satisfactorily modified for the manufacture of large products, either to be mass produced in workshops, or to produce supporting structures specifically designed in each individual case for the particular type of product to be constructed.

Moreover, the previously known processes do not lend themselves to the production of load bearing structures in which the interconnections between the various layers of plastics material have a specific structural supporting function in fulfilment of which the required dimensions and positioning of the components are calculated for each product to be made.

OBJECTS OF THE INVENTION

On object of this invention is to permit the manufacture of products having a load bearing plastics material structure the strength of which may be calculated in advance as has previously been done with construction materials such as reinforced concrete, steel or wood.

Another object of this invention is to enable products in reinforced, thermosetting plastics material to be made directly *in situ* (with the provision of suitable workshops) when large products such as large pipe systems, reservoirs, towers, and large girders are to be made, whereas the same process can be utilised for manufacturing products of smaller dimensions in workshops or establishments having suitable equipment and working either continuously or intermittently.

A further object of the present invention is to provide a process by means of which it is possible to design and construct products, even of large dimensions, the constructional elements of which are arranged according to a theoretical reticular configuration determined by the lines of force and the isostatic lines set up by the external stress which the product is likely to have to withstand.

Another object of this invention is to provide a process for the manufacture of products in reinforced thermosetting plastic materials, by means of which it is possible to manufacture products having a plurality of parts, in which there are various combinations of mechanical, chemical, physical, biological or aesthetic characteristics provided according to the stresses and the uses for which the product is intended.

SUMMARY OF THE INVENTION

According, therefore, to the present invention there is provided a process for the manufacture of articles at least part of some of the walls of which are formed of a thermosetting plastics material as a load bearing structure having in cross section at least a first plastics material layer, a second plastics material layer, an intermediate plastics material layer between the said first and second layers, and one or more load bearing connecting elements extending between the first and second layers through a space or spaces in the said intermediate layer, the said connecting element or elements being bonded at least to the said first and second layers, comprising the steps of forming one of the said first or second layers into a shape determined by the shape of the article to be made, forming the said intermediate layer having the spaces through which the connecting elements are to extend, forming the said connecting elements, forming the other layer or layers necessary to complete the structure, and rigidly bonding the said first and second layers to the said connecting elements.

Various other features and advantages of this invention will become apparent from the following description of the accompanying drawings which is provided merely by way of example.

DESCRIPTION OF THE EMBODIMENTS

Figure 1:
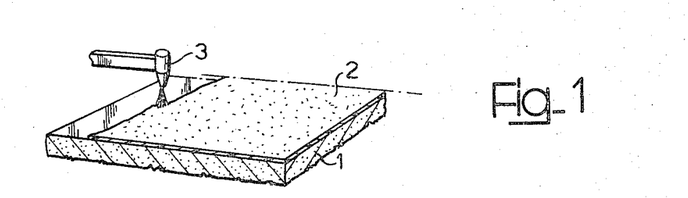
FIGS. 1, 2 and 3 are diagrammatic illustrations of various steps of the process of this invention in the case of the manufacture of a flat product.
Figure 2:
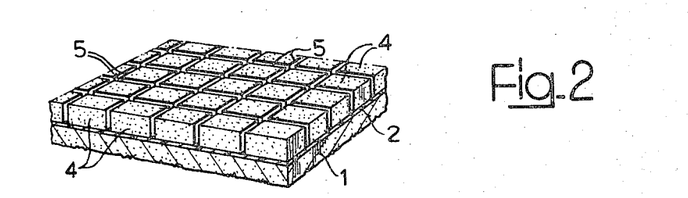
Figure 3:
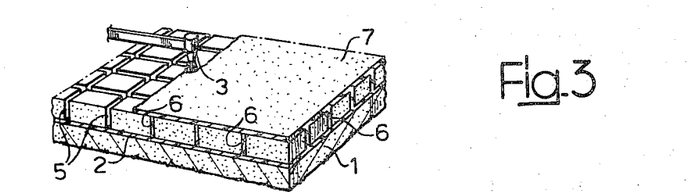

Referring now to the drawings, and particularly to FIGS. 1, 2 and 3 there is shown a former 1 which supports part of the product to be made. In the case illustrated in FIG. 1 the former 1 is substantially flat as the product to be made will be a flat element. A first layer 2 of a thermosetting plastics material may be deposited, for example, by means of a spraying device shown diagrammatically, and indicated by the reference numeral 3.

The layer of thermosetting plastics material 2 which is sprayed or otherwise deposited onto the shell 1, is of a type known *per se* and may be reinforced, if required, by glass fibre or by a granular or other reinforcing material.

The next step in the process, as shown in FIG. 2 is the deposition onto the layer 2 of a plurality of blocks 4, spaced from each other to form a graticule of interstices 5, the interstices 5 intersect one another according to a predetermined arrangement or configuration, in dependence on the stresses which the product will have to withstand.

The blocks 4 are preferably made of an expanded plastics material, for example polyurethane; they may be solid or hollow depending on the weight limitations of the product being manufactured. Instead of using expanded polyurethane for the blocks 4, another expandable plastics material may be used, for instance polystyrene. Care must be taken, however, to apply to the external surfaces of blocks of such material, a protective coating of some substance which is compatible with the thermosetting plastics material used for the layer 2 and with the other component parts of the product with which they are likely to come into contact.

With reference to FIG. 3 it will be seen that the product is completed by filling in the interstices 5 with a thermosetting plastics material which will generally be the same material as that forming the layer 2. This step forms the load bearing connecting elements in the interstices 5; these load bearing connecting elements are indicated by the reference numeral 6.

Simultaneously with the formation of the load bearing connecting elements 6, or immediately after their formation, a second layer 7 is applied, this latter generally forming an outside face of the product. Application of the material for forming the connecting elements 6 and the layer 7 may also be effected by the same spraying device 3 shown in FIG. 1 for applying the layer 2.

Figure 4:
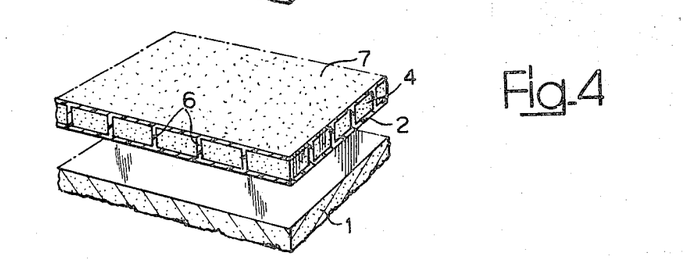
FIG. 4 is a perspective view of one part of the flat product formed by the steps illustrated in FIGS. 1, 2 and 3.

Referring now to FIG. 4 the product thus formed, is shown detached from the auxiliary shell 1. The product consists of a first load bearing layer 2, a second load bearing layer 7, an intermediate layer comprising a plurality of blocks 4, and finally a plurality of interconnecting elements 6 which join the layers 2 and 7, and which at the same time are bonded to the walls of the blocks 4.

Subsequent polymerization of the thermosetting plastics material used forms a rigid union of the various layers and elements of the product.

From the above description it will be understood how, with such a process, it is possible to make products of any desired shape and dimensions simply by providing in advance a shell 1 having the external form or configuration of the product which it is desired to manufacture. Moreover, it is also possible, with careful arrangement of the blocks 4, to form the connecting elements 6 in the particular positions of the product where it is necessary to provide increased structural strength.

The process described above thus makes it possible to manufacture a structure designed to conform to any necessary constructional engineering criteria. Similarly, the products may also be made *in situ* at any desired location with the provision of suitable workshops.

Figure 5:
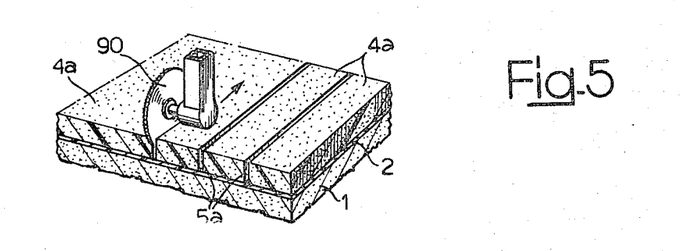
FIG. 5 is a perspective view showing an alternative step to replace that shown in FIG. 2.

With reference to FIG. 5 which shows a first variation of the process described above, it will be seen that after the layer 2 has been deposited onto the auxiliary shell 1, there may be formed a single relatively thick layer 4a of expanded plastics material which may be, for example, an expanded polyurethane.

The layer 4a may then be cut successively, for example by a circular saw such as the saw 90 diagrammatically illustrated in FIG. 5 so as to remove some of the deposited layer 4a to form a plurality of rows of sawn slots as shown at 5a. Again, the configuration of the slots 5a can be arranged in dependence on the particular structure which it is desired to produce. Subsequently the process comprises filling the slots 5a to form the connecting elements, such as those indicated by 6 in FIG. 3, and then forming a second load bearing layer such as that shown in FIG. 4.

Figure 6:
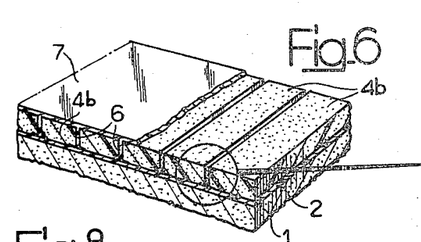
FIG. 6 is a perspective view illustrating a second alternative to the step of the process illustrated in FIG. 2.

Formation of an intermediate layer such as that formed by the blocks 4 or 4a of FIGS. 1 to 4, in accordance with another variation of the process described above, may be effected as shown in FIG. 6 by arranging, upon the first load bearing layer 2, a plurality o felements 4b of expanded plastics material which may be of either solid or hollow polyurethane or polystyrene, for example, over which there has previously been applied, at least over the sides 40b, a coating of reinforced resin.

Figure 9:
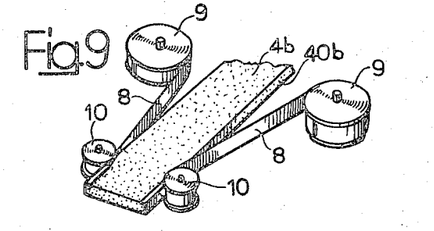
FIG. 9 is a diagrammatic illustration of the application of a reinforced coating to the edges of the blocks illustrated in the variation shown in FIGS. 7 and 8 of the step of FIG. 2.

The coating on the sides 40b of the elements 4b may be effected, for example, by the method shown in FIG. 9 in which a reinforced resin coating in the form of the ribbon 8 wound onto a bobbin 9 is first applied to the edges 40b through guide rollers 10 having a recess moulded in the periphery thereof the dimensions of which depend on the thickness and form of the elements 4b. As shown on an enlarged scale in FIG. 7, the elements 4b are placed on the layer 2 near to each other but separated so as to form the interstices 5 which will be filled subsequently with thermosetting plastics material during the formation of the second load bearing layer 7.

Figure 7:
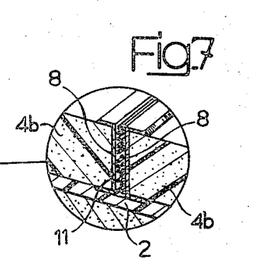
FIG. 7 is an enlarged view of a detail of FIG. 6.

In this variation of the process there may be provided reinforcing elements 11 in the interstices 5, the elements 11 being shown as long fibres in FIG. 7. Using this variation of the process it is possible to obtain products of the connecting elements 6 of which have different resistance characteristics in various different directions, due to the presence of reinforcement material incorporated in the coating 8, and due to the unidirectional reinforcement material in the form of long fibres 11 in the connecting elements 6.

Figure 8:
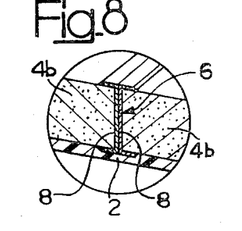
FIG. 8 is an enlarged view of a detail of a third alternative to the step illustrated in FIG. 2 similar to that of FIG. 7.

In a third variation of the process, illustrated on an enlarged scale in FIG. 8, the elements of expanded material 4b, each having a coating 8 on the sides thereof, may be directly placed close together on the layer 2, so that the connecting element 6 is formed directly from the union of the two adjacent coatings 8.

Figure 10:
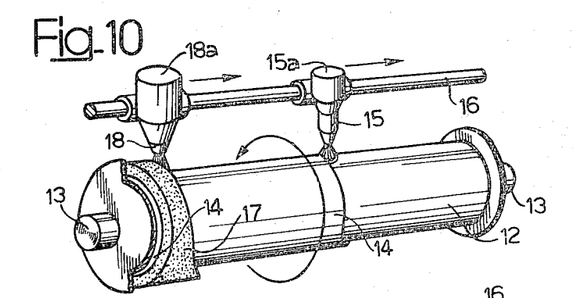
FIGS. 10 and 11 are diagrammatic illustrations of various steps of the process of this invention in the case of the manufacture of a tubular product.
Figure 11:
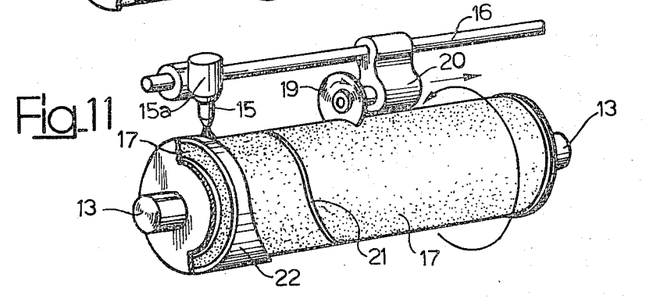

For the production of tubular items, and particularly tubes of a predetermined length for various different applications, one example of a process according to this invention is illustrated in FIGS. 10 and 11. The process comprises the steps of arranging a removable mandrel 12 for rotation on pivots 13, placing or forming a first layer 14 of reinforced thermosetting plastics material on the surface of the mandrel. The layer 14 may be deposited for example, by a spraying device shown diagrammatically at 15 which is movable parallel to the axis of the mandrel 12 on a bar 16. The material to be sprayed onto the mandrel may be continuously fed into the chamber 15a of the sprayer 15 through a flexible tube (not shown). Over the layer 14 there is deposited a further layer 17 constituted of expanded plastics material such as polyurethane. The latter material may also be deposited by a sprayer mechanism 18, again movable parallel to the axis of the mandrel 12 and having a chamber 18a which is continuously fed through a flexible tube (not shown).

Once the layer 17 of expanded material has been deposited to the desired thickness, which depends upon the mechanical strength which it is desired to obtain in the tubular product, one or more helical furrows or grooves are cut on it by means of the device shown in FIG. 11 comprising a circular saw or cutter 19 which is also movable on the bar 16 and carried on a movable support 20. In FIG. 11 there is shown a single helical furrow 21 but there may be provided a number of grooves forming a plurality of helices on the layer 17 after the fashion of a multi-start screw thread.

The grooves 21 extend through the whole thickness of the layer 17 and preferably extend at least some distance into the surface of the bearing layer 14. The next step in the process comprises filling in the grooves 21 with a thermosetting material which may be of the same type as that employed for the formation of the layer 14 to form a helical load bearing element 23, and subsequently there is formed a second load bearing layer 22 which constitutes the outer casing of the tubular product.

Figures 12, 16:
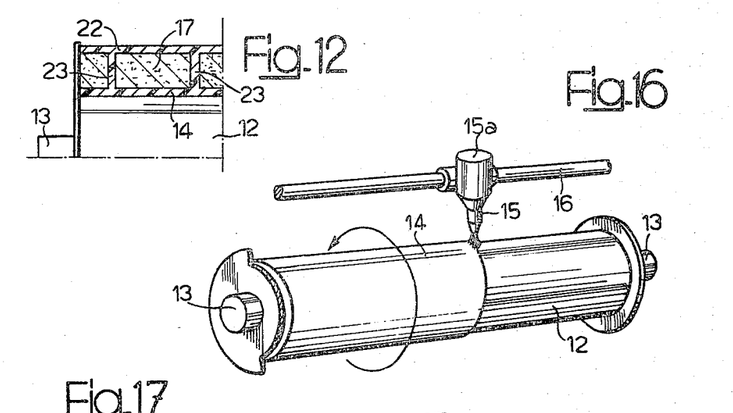
FIG. 12 is a partially sectioned view of the wall of a tubular product formed with the process of FIGS. 10 and 11.
FIGS. 16 and 17 are diagrammatic illustrations of the steps of a first variation of the process of the invention shown in FIGS. 10 and 11.

A longitudinal section of the part of the wall of a completed tubular product which is ready to be detached from the mandrel 12 is diagrammatically illustrated in FIG. 12 in which the relative configuration of the layers 14 and 22 and the intermediate layer 17 of expanded material subdivided by the helical load bearing element 23 which joins the internal layer 14 to the external layer 22. From the above description it will be appreciated that the longitudinal section of the tubular product corresponds substantially to the general cross section of a product made by the process of this invention.

Figures 13, 14, 15, 19, 20, 21:
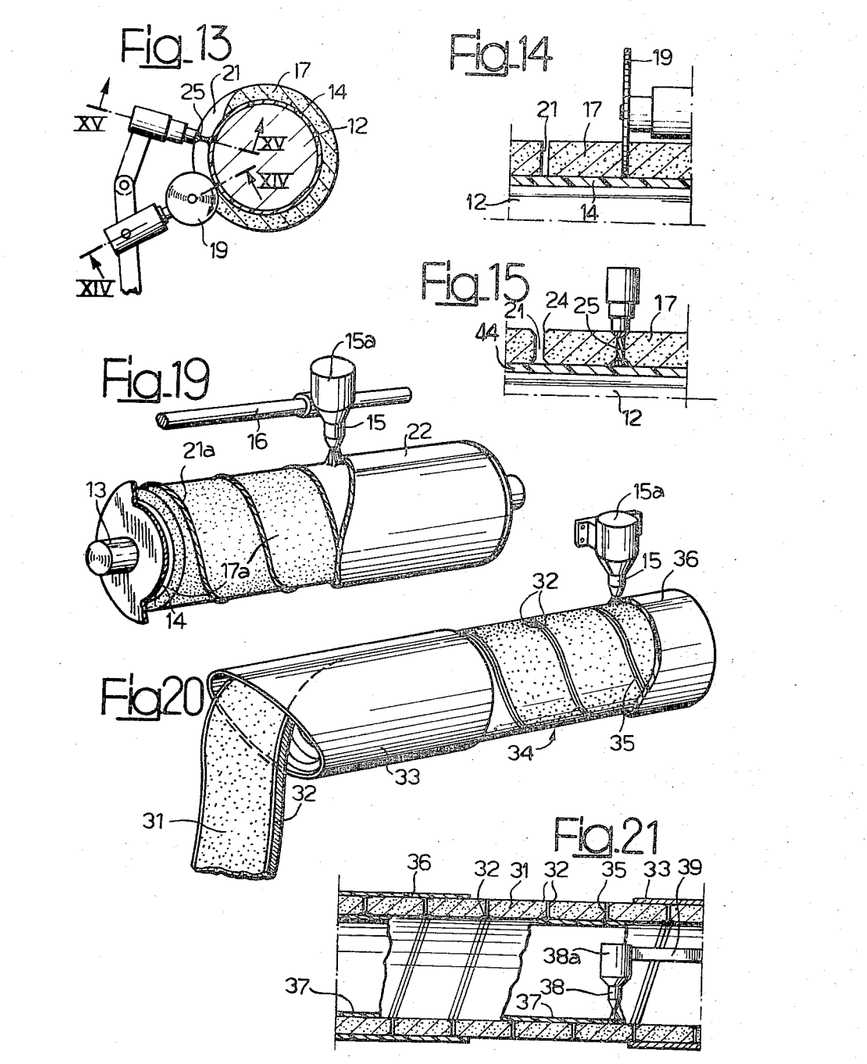
FIG. 13 is an end view illustrating a modification of the step of the process shown in FIG. 11.
FIG. 14 is a sectional view taken on the line XIV—XIV of FIG. 13.
FIG. 15 is a sectional view taken on the line XV—XV of FIG. 13.
FIG. 19 is a diagrammatic illustration of the main steps of a second variation of the process illustrated in FIGS. 10 and 11.
FIGS. 20 and 21 are diagrammatic illustrations of the main steps of a third variation of the process illustrated in FIGS. 10 and 11, suitable for the manufacture of a tubular product of indefinite length.

The grooves 21 which provide moulds for filling with reinforcing thermosetting material, to form the helical connecting element 23, may have a cross section different from the rectangular section shown in FIG. 12. For example, the cross section may be provided, as shown in FIG. 15, with bevels 24 where the layers 14 and 22 are connected to the element 23. Whilst the production of a helical groove or grooves 21 having a rectangular cross section may be effected simply, with a circular cutter 19 (see FIG. 14), helical grooves having bevels 24 require an additional milling cutter such as that shown at 25 in FIGS. 13 and 15.

Figures 17, 18:
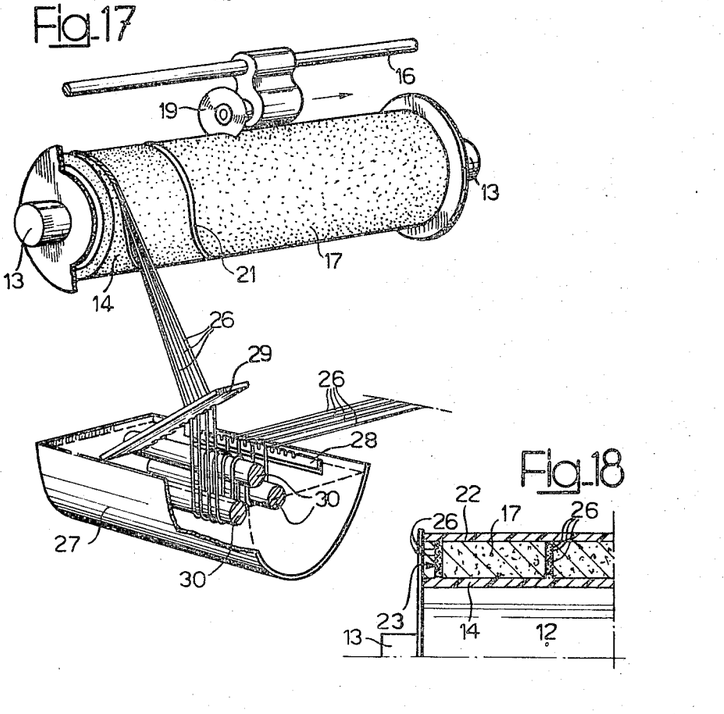
FIG. 18 is a partial diagrammatic sectional view of the wall of a tubular product formed by the process of FIGS. 16 and 17.

With reference to FIGS. 16 and 17 it will be seen that the process for the manufacture of tubular products of a set length on the revolving mandrel 12, as described above may be modified by inserting within the helical groove or grooves 2, a reinforcing element in the form of a continuous fibre or fibres, for instance glass fibres, impregnated with the same thermosetting plastics material as layer 14, or with different material. This modification is illustrated particularly in FIG. 17 where the reference numeral 26 indicates the reinforcing fibres and there is shown a vat 27 containing the plastics material for impregnation of the fibres 26. In the vat 27 the fibres 26 are kept separate by means of combs 28 and 29, they pass around various rollers 30 while they are being impregnated, and are subsequently fed to the groove 21.

The structure thus obtained is partially diagrammatically illustrated in section in FIG. 18; this structure corresponds to that shown in FIG. 12 with the addition of the continuous fibres 26 embedded in the helical connecting element 23.

The processes described and illustrated above with reference to a rotating mandrel may be effected in like manner by using a detachable cylindrical shell around which the spraying devices for the plastic material and for formation of the helical grooves are caused to rotate and move axially. Such a method of operation is particularly advantageous for the manufacture of large cylindrical and/or tubular products.

The process of this invention for the manufacture of tubular products of a given length, may also be effected utilising a second variation illustrated in FIG. 19. According to this variation, after deposition of the bearing layer 14 of thermosetting plastics material on to a rotating mandrel 12 there is wound one or more helices from a strip or ribbon 17a of expanded material such as polyurethane.

The ribbon 17a is so wound that adjacent edges of the ribbon are not touching but are spaced to form a helical groove indicated 21a. When the winding of the ribbon 17a is finished, the helical grooves 21a are filled with a thermosetting reinforcing material external load bearing layer 22 is formed over the composite tube thus formed.

The composition of the wall of a product manufactured by this process is substantially the same as that shown in FIG. 12 or in FIG. 18 which illustrates the case in which long reinforcing fibres 26 are inserted in the grooves 21a.

With reference now to FIG. 20 it will be seen that another variation of the process of this invention allows the manufacture of tubular products which may be of indefinite length. For performing the third variation of the process according to this invention, a continuous ribbon of expanded plastics material is employed. This may be, for example, a polyurethane which has been reinforced at the edges in advance, by means of a coating of reinforced thermosetting plastics material. Such a ribbon indicated by the reference numeral 31 in FIG. 20 is provided with the lateral reinforcement strips 32 which may be applied, for example, by the method shown in FIG. 9.

The continuous ribbon 31 of expanded plastics material of predetermined thickness, is fed into a suitable forming apparatus shown at 33 and known *per se*, and is thereby wound helically. The contiguous edges 32 adhere together so that there is formed a continuous tubular body, generally indicated 34 in FIG. 20. The tubular body 34 is automatically provided with connecting elements in the form of helix (indicated 35) obtained as a result of the joining of the reinforcement strip 32 on the edges of the strip 31. This variation of the process is completed by the deposition of a layer of reinforced thermosetting material 36 on the outside of the tubular body 34, and the deposition of a similar layer 37 inside the tubular body 34.

Whilst deposition of the external layer 36 may be effected with apparatus similar to the spraying device 15 upon a fixed support (not shown), deposition of the internal layer 37 must be carried out by means of a further sprayer 38, having a chamber 38a and supported on a fixed arm 39, inside the tubular body 34, as shown in FIG. 21.

Figure 22:
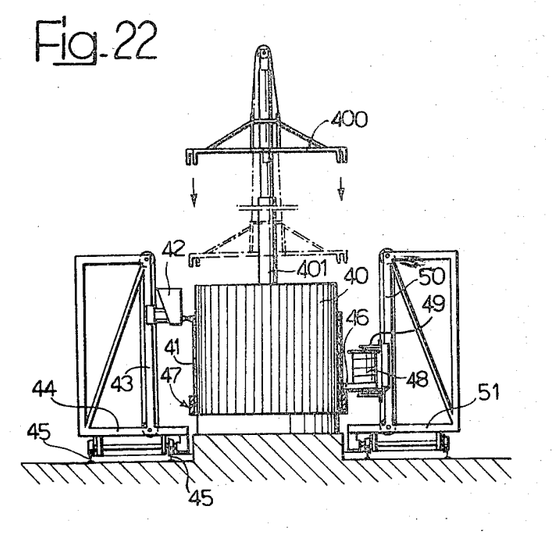
FIGS. 22 and 23 are diagrammatic illustrations of the main steps of the process of this invention applied to the case manufacture of a large cylindrical product having a vertical axis.
Figure 23:
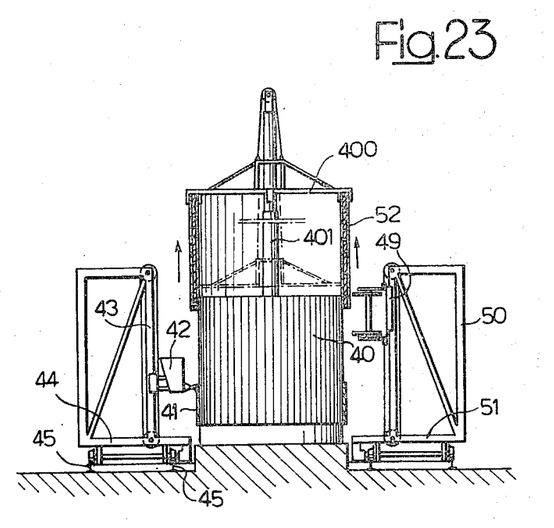

For manufacturing large cylindrical products with vertical axes, such as large vertical reservoirs, the production of which necessarily involves the availability of a workshop at the site where the product is to be made, it will be appreciated that the processes already described may be used. For example, the process described with reference to tubular bodies manufactured horizontally may be utilised with suitable adaptations to suit the particular case. In particular, the performance of the process of this invention for the manufacture of such large tubular bodies requires, as shown in FIGS. 22 and 23, the provision of a removable cylindrical shell 40 of adequate height to enable manufacture of at least a first load bearing section or piece of the cylindrical product.

Onto the external wall of the shell 40 there is deposited a first layer of reinforced thermosetting material 41 by means of apparatus, indicated 42, which is vertically movable on scaffolding 43 mounted on a carriage 44 which is movable on tracks 45 arranged concentrically around the shell 40. When the layer 41 has been deposited, a ribbon 46 of expanded plastics material such as polyurethane is helically wound over its surface.

The winding of the helix of the ribbon 46, to form a layer 47, is effected by means of a bobbin 48 mounted on the frame 49 and movable vertically on a second scaffolding 50 which, in its turn, is carried by a further carriage 51 movable on tracks 45. The ribbon 46 of expanded material may be wound onto the layer 41 so that adjacent edges thereof are separated by a small space to create a groove of a type illustrated and described hereinbefore so that, when a further external layer 52 is deposited, as shown in FIG. 23, connecting elements of the plastics material are formed between the layer 41 and layer 52.

Deposition of the external layer 52 and filling of the helical groove left free by the ribbon 46, is either effected by means of the apparatus 42 mentioned above, or by means of another equivalent apparatus (not shown).

Alternatively, the ribbon 46 may be reinforced at the edges as in the method illustrated in FIG. 9. In this case the winding of the ribbon 46 around the shell 40 over the layer 41 may be performed in such a way that if the ribbon 46 make contact with each other thereby automatically forming the load bearing connecting elements which extends through the intermediate layer and connects the internal layer 41 with the external layer 52.

When one load bearing piece of predetermined height (the height of the shell 40) has been completed, it may be raised, as shown diagrammatically in FIG. 23, sliding it up the shell 40 by means of lifting apparatus 400 mounted on a central column 401. The exposed part of the shell 40 can then be used again for the production of a second piece of the structure and so forth until a cylinder of the desired height is obtained.

A further variaton of the process of this invention may also be used for the manufacture of cylindrical structures having a vertical axis.

Figures 24, 25:
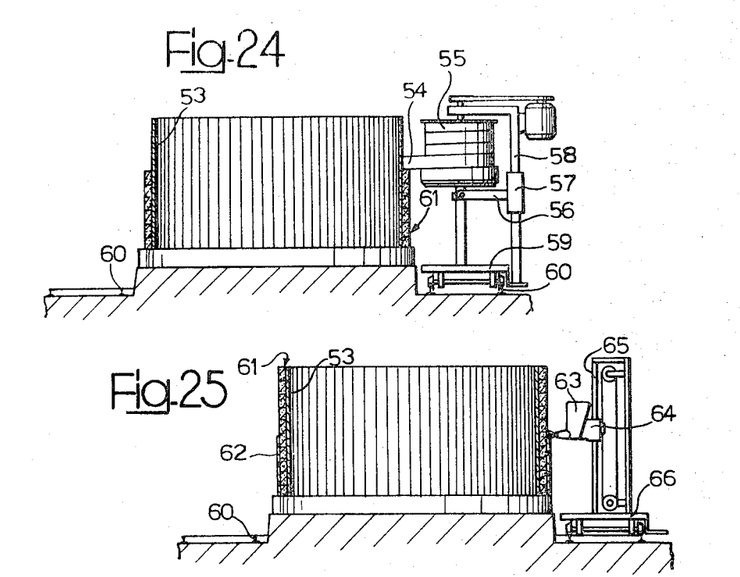
FIGS. 24, 25, 26 are diagrammatic illustrations of the main steps of a first variation of the process illustrated in FIGS. 22 and 23.
Figure 26:
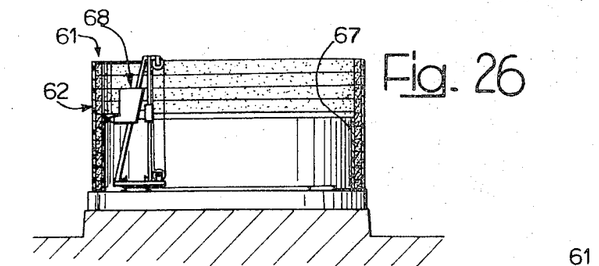
Figure 27:
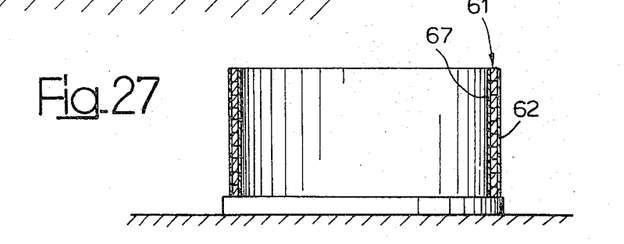
FIG. 27 is a diagrammatic sectional view of a product made by the process of FIGS. 24, 25 and 26.

This variation is illustrated in FIGS. 24, 25 and 26 and the completed product is illustrated diagrammatically in FIG. 27. In this variation of the process there is provided, *in situ*, a shell 53 (FIG. 24) which can be dismantled.

Around the external periphery of the shell 53 there is helically wound a ribbon 54 of expanded plastics material, for example polyurethane which, preferably, is of the type with reinforced edges described in relation to FIG. 9. The winding of the ribbon 54 may be effected by unwinding the ribbon 54 from a coil 55 supported by a frame 56 which is movable vertically by means of a slide 57 on a column of the scaffolding 58. In its turn the framework 58 is carried by a carriage 59 movable on tracks 60 arranged concentrically around the shell 3. Upon completion of the winding of the ribbon 54 to form a layer generally indicated 61, there is deposited onto the layer 61, a further layer of reinforced thermosetting plastics material 62 (FIG. 25). Deposition of the layer 62 is effected by means of a sprayer shown diagrammatically at 63 which is vertically movably mounted in a slide 64 on a column 65 forming part of a framework mounted on a carriage 66 which is also mounted on the tracks 60 mentioned above.

The auxiliary shell 53 is then dismantled from the product which, although not yet completed, is nevertheless capable of supporting itself.

When the shell 53 has been removed, there is deposited on the internal surface of the layer 61 a load bearing layer of reinforced thermosetting plastics material 67. Deposition of the layer 67 is effected by means of apparatus indicated generally 68 which corresponds to that illustrated for the deposition of layer 62 in FIG. 25. The cross secion of the wall of the resulting product (see FIG. 27) is again, the one typically obtained with the process of this invention and shown, for example, in FIGS. 12 and 18.

It is thus possible, by using one of the processes described as examples of this invention, to manufacture products of forms and dimensions varying from simple flat walls to tubular bodies of a given length or of indefinite length. The manufacture of large cylinders, and the manufacture of hulls for ships of any desired tonnage and dimensions can also be achieved by means of this process. Moreover, when made by the process of this invention, the plastics material structures are effective load bearing structures because the reinforcement or connecting elements between the external layer may be arranged and formed in positions calculated to be necessary relative to the forces which the product has to withstand.

Finally, since the plastics materials employed allow considerable freedom of choice with respect to their physical properties (for example, resistance to chemical, biological or other agents) products made in accordance with the processes of this invention may be formed to have any specific qualities or characteristics required by the conditions in which the product is to be used.

Finally, the products may be superficially treated by the deposition of further layers to provide any desired particular characteristics of aesthetic nature upon the exterior.

We claim:

1. A process for the manufacture of tubular articles at least part of the walls of which are formed of a thermosetting plastics material as a load bearing structure comprising:
   inner and outer plastics material layers,
   at least one intermediate plastics material layer between said inner and outer plastics material layers, and
   at least one load bearing connecting element extending between said inner and outer plastics material layers through at least one space in said intermediate layer,
   at least said load bearing connecting element and said inner and outer plastics material layers being bonded together,
   said process comprising the steps of:
      forming the inner plastics material layer onto a rotatably mounted mandrel,
      depositing onto said inner layer a continuous layer of an expanded plastics material to the required thickness of said intermediate layer,
      removing part of said continuous layer so as to form at least one continuous helical groove of predetermined pitch in said intermediate layer,
      filling said helical groove with a reinforced thermosetting plastic material to form said at least one load bearing connecting member,
      forming said outer plastics material layer over said intermediate layer, and
      polymerizing said thermosetting plastics material to bond said first and second layers to said load bearing connecting elements.

2. The process of claim 1, wherein the inner plastic layer is formed on a mandrel to form the inner reinforcing layer and the intermediate plastic layer is formed on the outer surface thereof.

3. The process defined in claim 1, wherein the intermediate layer is formed by helically winding at least one strip of plastic material to form a cylindrical layer, with the edges of adjacent turns of the said strip spaced from each other by a gap which defines said helical groove in which the hardenable plastic reinforcing element is located.

4. The process defined in claim 3, wherein said plastic strip is wound helically on a mandrel and the hardenable plastic material is introduced into the helical gap between adjacent turns of said at least one strip to form the reinforcing connecting element.

5. The process defined in claim 3, wherein the edges of said at least one strip of plastics material are provided with reinforcing plastic coatings which, when the strip is wound helically, define at least part of said gap between the edges of adjacent turns of the strip and simultaneously form in said gap at least part of said reinforcing connecting element.

6. The process defined in claim 5, wherein each edge coating is applied to the strip in the form of a plastics ribbon which is wrapped around the respective edge of the strip.

7. The process defined in claim 5, wherein the edge coatings on adjacent turns of said helically wound strip abut each other to fill the helical groove and are bonded directly to each other to form the reinforcing connecting element.

8. The process defined in claim 5, wherein the first and second reinforcing plastic layers are applied to the intermediate layer after the formation of the latter from the helically wound strip or strips.

9. The process defined in claim 3, wherein said at least one strip forming the intermediate layer is wound onto the surface of a removable cylindrical former arranged with its axis vertical, and the former is subsequently removed.

10. The process defined in claim 9, in which the outer reinforcing layer of hardenable plastic material is applied to the outside of the intermediate layer after formation of the latter, and the inner reinforcing layer of hardenable plastic material is applied to the inside of the intermediate layer after removal of the cylindrical former.

11. The process defined in claim 1, wherein the intermediate layer is formed as a continuous cylindrical layer and part of said layer is subsequently removed to form said at least one helical groove, which is then filled with hardenable plastic material to form at least one reinforcing connecting element.

12. The process defined in claim 11, wherein hardenable plastic material is applied to the outside of the intermediate layer to form the outer reinforcing layer after filling said at least one helical groove with hardenable plastic material.

13. The process defined in claim 11, wherein at least one helical groove formed in the intermediate layer extends at least some distance into the thickness of the inner reinforcing layer of plastic material.

14. The process defined in claim 11, wherein filamentary material is located in said at least one helical groove and is impregnated with hardenable plastic material which form the respective reinforcing connecting element.

15. The process defined in claim 14, wherein the filamentary material is wound into said at least one helical groove after being guided through a bath containing the hardenable plastic material in liquid form which material impregnates the filamentary material before it enters said groove.

16. The process defined in claim 11, wherein said at least one helical groove is formed by a rotary cutter, the axis of which is inclined to the axis of the cylindrical intermediate layer, and said cutter is advanced relatively to said intermediate layer parallel to the axis of the latter while the cutter is rotated about its axis to form the helical groove with a predetermined pitch.

17. The process defined in claim 11, wherein said at least one groove is formed with a rectangular cross-section and prior to the application of the reinforcing element the edges of the groove are bevelled on at least one surface of the intermediate layer to form at least one enlarged end portion in the cross-section of the groove.

18. The process defined in claim 1, wherein the hardenable plastic material from which the reinforcing connecting element is formed also forms at least one of the two reinforcing layers of plastic material on the intermediate layer.

19. A tubular article made by the process defined in claim 1.

References Cited

UNITED STATES PATENTS

| | | | |
|---|---|---|---|
| 3,296,047 | 1/1967 | Parr | 264—310 X |
| 3,379,591 | 4/1968 | Bradley | 264—310 X |
| 3,399,095 | 8/1968 | Hyland | 264—47 X |
| 3,366,719 | 1/1968 | Lueders | 264—54 X |
| 3,297,802 | 1/1967 | Powers | 264—47 |
| 3,383,257 | 5/1968 | James | 264—47 X |
| 3,118,800 | 1/1964 | Snelling | 264—47 X |
| 3,275,720 | 9/1966 | Ohsol | 264—48 |
| 3,289,703 | 12/1966 | Brown | 264—47 X |
| 3,309,458 | 3/1967 | Yoshimura et al. | 264—47 X |
| 3,695,959 | 10/1972 | Keith et al. | 264—45 X |

HERBERT S. COCKERAM, Primary Examiner

U.S. Cl. X.R.

138—141, 149, 150; 161—160; 264—54, 310, Dig. 40